United States Patent [19]

Rutshtein et al.

[11] 4,046,490
[45] Sept. 6, 1977

[54] METHOD AND APPARATUS FOR ANTISURGE PROTECTION OF A DYNAMIC COMPRESSOR

[75] Inventors: Alexander Rutshtein; Naum Staroselsky, both of West Des Moines, Iowa

[73] Assignee: Compressor Controls Corporation, Des Moines, Iowa

[21] Appl. No.: 636,803

[22] Filed: Dec. 1, 1975

[51] Int. Cl.² .................. F04B 49/00; F03B 15/00
[52] U.S. Cl. ........................... 417/28; 417/47; 415/1; 415/11; 415/17; 415/27
[58] Field of Search ............... 417/26, 28, 47; 415/1, 415/11, 17, 27

[56] References Cited

U.S. PATENT DOCUMENTS

| 3,009,631 | 11/1961 | Dimrock | 415/27 |
| 3,362,626 | 1/1968 | Schlirf | 417/26 |
| 3,473,727 | 10/1969 | Eastman | 415/27 |
| 3,574,474 | 4/1971 | Lukacs | 415/17 |
| 3,737,252 | 6/1973 | Pilarczyk et al. | 415/27 |
| 3,876,326 | 4/1975 | Weitz | 415/1 |

Primary Examiner—Carlton R. Croyle
Assistant Examiner—Gregory P. LaPointe
Attorney, Agent, or Firm—Henderson, Strom and Strom

[57] ABSTRACT

A method and apparatus for protecting a dynamic compressor from surge. The method includes a first step for providing a simultaneous control of a smaller relief means and a main control member of a dynamic compressor or the driver thereof for changing the performance of the compressor. This combined action provides for the protection from surge and at the same time insures the invariability of the main control parameters of pressure, mass flow rate to the user, or the speed of rotation. The second step provides for controlling a larger relief means and provides for antisurge protection in those cases when the first step is not sufficient to protect the compressor from surge. Apparatus is also provided for automatically implementing the method.

4 Claims, 2 Drawing Figures

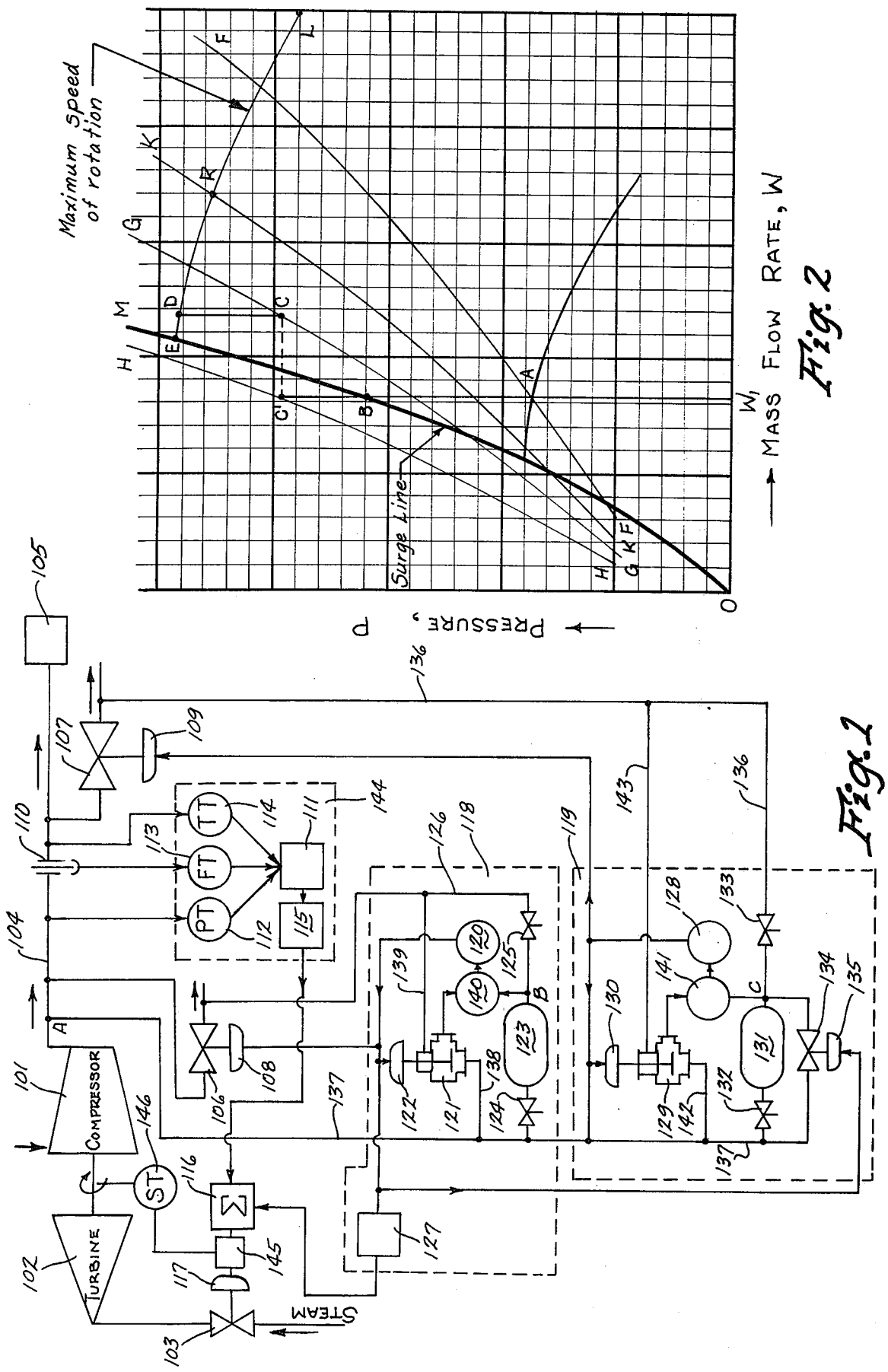

METHOD AND APPARATUS FOR ANTISURGE PROTECTION OF A DYNAMIC COMPRESSOR

BACKGROUND OF THE INVENTION

The present invention relates generally to preventing surge in compressors and more particularly for providing a method and means for providing antisurge protection for an installation having a dynamic compressor.

The main function of a control system for a dynamic compressor is to provide a control to protect the compressor and a user of a compressed gas from surge and its consequences. Generally, the intent of an antisurge system is to prevent the operating point of a compressor from approaching the surge limit by blowing-off or recirculating the part of the compressed gas. In order to achieve this, however, the surge control line must be set at a certain distance from the surge limit line.

In certain cases when the location of the surge limit line is not stable in time, even the best devices available which are designed to protect the compressor from approaching this limit on the field of a compressor performance map are not able to prevent surge. If the location of the surge limit on said map under a certain temperature and pressure of gas in the suction is known, then usually it is possible to define its new location when these conditions in suction change. But the location of a surge limit depends not only on temperature and pressure in the suction port, but it also depends upon the geometry of the running part of a compressor, the molecular composition of the gas, conditions in intermediate collers, etc. It is therefore very difficult, if not impossible, to take all of the important parameters into consideration. It is for this reason that all known compressor control systems which are designed to protect compressors from approaching a surge limit, and which take into consideration only certain conditions in suction, cannot always fulfill their task when the above mentioned conditions other than the parameters of a gas in the compressor's suction change.

Consequently, instead of attempting to prevent the approach of a compressor's operating point to an expected position of a surge limit, it would be desirable to protect a compressor from surge by the timely and proper measuring of certain surge parameters and using this information to activate a quick relief valve. It would also be desirable to be able to protect the user from interruptions or from considerable deviations of pressure or flow rate of a compressed gas, while at the same time protecting a compressor from surge.

SUMMARY OF THE INVENTION

The present invention relates to a method and system for protecting a dynamic compressor from surge. According to the present invention, a dynamic compressor with a turbine or an electromotor drive is protected from surge by an automatic system which includes apparatus for implementing either one step or two steps acting successively. In the more general situation when two steps are used, the first step controls simultaneously both a smaller relief means and the main control member of the compressor or of its driver (steam distributing system, fuel valve, throttling means installed in compressor's suction, etc.). When the controlled parameter is flow rate, this smaller relief means is installed upstream of a flow measuring device located in the discharge of a compressor. The second step controls the larger relief means. When the controlled parameter is flow rate, this larger relief means is installed downstream of the above mentioned measuring device. When the above mentioned controlled parameter is pressure or speed of rotation, the location of both smaller and larger relief means can be arbitrary. The second step of protection can operate only if the relief means operated by said first step has been already opened.

It is known that the surge pulsations can be distinguished from the other transient processes by its much higher rate of pressure drop in the discharge line. For example, see "An Experimental Study of Surge in Centrifugal Compressor", published in June of 1975 by CREARE, Inc., Hanover, New Hampshire 03755, which publication is incorporated herein by reference. Each of the above mentioned two steps of protection is based on using this before mentioned feature of surge and correspondingly includes devices measuring the rate of the pressure drop in discharge.

An object of the present invention is to protect a dynamic compressor from the serious dropping of pressure and flow rate always associated with surge by means of activating a quick acting smaller relief means.

Another object is to compensate for the influence of the flow rate of compressed gas through the above mentioned smaller relief means on the controlled parameter, by means of the appropriate action on the main control member of a compressor or its driver.

A further object of this invention is to further protect the compressor from surge in such cases when, after operation of the smaller relief means, surge repeats a second time for any possible reason, by means of activating a quick acting larger relief means.

Other objects, advantages and novel features of the invention will become apparent from the following detailed description of the invention when considered in conjunction with the accompanying drawings.

BRIEF DESCRIPTION OF THE DRAWINGS

FIG. 1 is a schematic diagram of the protective control system of a compressor; and FIG. 2 shows the compressor performance map with plotted lines of the operating conditions.

DETAILED DESCRIPTION OF THE INVENTION

Referring now to the drawings, FIG. 1 shows a compressor installation with the protective control system of the present invention, and a conventional control system designed, for example, to maintain the constant mass flow rate to the user.

The installation includes, for example, a dynamic air compressor 101, a turbine drive 102 having a steam distributing device 103, a pipeline 104 connecting the compressor 101 to the user 105 of compressed air. The pipeline 104 is supplied by two blow-off valves 106 and 107 with the corresponding actuators 108 and 109, and by a flow measuring device 110. The valve 106 is installed upstream and the valve 107 is installed downstream of the measuring device 110.

The conventional mass flow rate control system 144 shown in FIG. 1 includes, for example, a pressure transmitter 112, a flow transmitter 113, a temperature transmitter 114, a calculator 111 of mass flow rate, and a mass flow controller 115. The signals of the system 144 go through first a summarizing device 116 and then a speed controller 145 to an actuator 117 of the steam distributing device 103, and speed of rotation being measured by a transmitter 146.

The protective control system shown in FIG. 1 is a two step system and it correspondingly consists of two subsystems. The first subsystem 118 is designed to operate the actuator 108 of the upstream blow-off valve 106 and the actuator 117 of the steam distributing device 103. The second subsystem 119 is designed to operate the actuator 109 of the downstream blow-off valve 107.

The first subsystem 118 consists of a pressure differential transmitter 140, a relay 120, a three-way valve 121 with a solenoid actuator 122, an accumulator or intermediate volume 123, a pipe 137 connecting volume 123 to the pipe 104, a pipe 138 connecting the pipe 137 with the valve 121, two valves, 124 and 125, a pipe 126 connected to the atmosphere, a pipe 139 connecting the pipe 126 to the valve 121, and a scaler 127.

The second subsystem 119 includes a pressure differential transmitter 141, a relay 128, a three-way valve 129 with a solenoid actuator 130, an intermediate volume 131, a pipe 137 connecting intermediate volume 123 to the pipe 104, a pipe 142 connecting the pipe 137 with the valve 129, two valves, 132 and 133, a pipe 136 connected to the atmosphere, a pipe 143 connecting the pipe 136 to the valve 129 and a valve 134 with a solenoid actuator 135.

Within the first subsystem 118 the pressure differential transmitter 140 measures the pressure difference between the compressor's discharge, point A and the point B, located between the intermediate volume 123 and the valve 125. The output signal of the transmitter 140 goes to the relay 120. The three-way valve 121 normally connects one input of the transmitter 140 to the pipeline 104 through the pipes 137 and 138. It can also connect the transmitter 140 to the atmosphere through the pipes 126 and 139. The other input of the transmitter 140 is always connected to the point B.

The valve 124 is adjusted so that a detachable difference between the pressures in the points A and B appears only when the rate of pressure drop in the compressor's discharge coincides approximately with the rate of pressure drop which is specific to the period of beginning of surge. In all other cases the pressures in points A and B stay equal.

The output signal of the relay 120 simultaneously goes to the actuator 108 of the upstream blow-off valve 106, to the scaler 127, to the actuator 122 of the three-way valve 121 and to the actuator 135 of the valve 134.

When surge begins, the pressure differential appears across the pressure differential transmitter 140. When this pressure differential reaches a certain present value, the relay 120 operates and gives the simultaneous signal for opening of the upstream blow-off valve 106, switching the three-way valve 121 to connect that input of the transmitter 140, which is normally connected to the point A, to the atmosphere and thus setting the valve 106 in the opened position, closing the valve 134 of the subsystem 119 and thus preparing this subsystem 119 for possible operation, and actuating the scaler 127.

Once the above mentioned input signal is received from the relay 120, the scaler 127 gives its output signal to the summarizing device 116. The device 116, changing the input signal of the speed controller 145, opens the steam distributing device 103 to the preset value in order to increase the power supply to the turbine 102 and thus to decrease or to eliminate the deviation of the main controlled parameter during the transient process caused by opening up the valve 106.

After operating the first step of the protective control, the reason for the commencement of surge will be investigated and eliminated. After that the subsystem 118 must be reset to be able to operate again. For this reason, it is necessary to open manually or remotely the valve 125 and thus to connect the volume 123 to the atmosphere. Then the pressure differential across the transmitter 140 becomes equal to zero. As a result, the relay 120 operates and gives the simultaneous signal for closing the valve 106, switching the valve 121 and thus connecting one input of the transmitter 140 with the point A, and the other input still being connected to the point B, opening the valve 134 of the subsystem 119 and thus deactivating it; and deactivating the scaler 127. Deactivating the scaler 127 means that its output signal decreases to the zero level, and accordingly, the summarizing device 116, changing again the input signal of the speed controller 145, closes the steam distributing means 103 on the same above mentioned preset value, thereby decreasing or eliminating the deviation of the main controlled parameter during the transient process caused by interrupting the outflow through the valve 106. The valve 125 is then manually or remotely closed to thereby prepare the subsystem 118 for operating again.

Within the subsystem 119, the pressure differential transmitter 141 implements exactly the same function that the transmitter 140 does within the subsystem 118. It measures the pressure difference between the point A and the point C located between the intermediate volume 131 and the valve 133. The output signal of the transmitter 141 goes to the relay 128 thereby implementing the same function as the relay 120.

The three-way valve 129 connects the one side of the transmitter 141 either to the pipeline 104 through the pipes 142 and 137, or to the atmosphere through the pipes 143 and 136. The other side of the transmitter 141 is always connected to the point C.

It is evident that if the valve 134 is open, then the pressure differential across the transmitter 141 cannot appear, and, accordingly, the subsystem 119 cannot operate.

The subsystem 119 is designed to operate after the operation of the subsystem 118 and while the valve 106 is still opened, if the resistance in the discharge of the compressor 101 continues to rise, and finally surge begins again. As it was already mentioned, the subsystem 119 is prepared for operation during the operating of the subsystem 118 by the automatic closing of the valve 134. The mode of operation of the subsystem 119 is exactly the same as with the subsystem 118, the only difference being that instead of opening the smaller upstream valve 106, it opens the bigger downstream valve 107, and it has no connection to the scaler 127.

After operating both the first step with subsystem 118 and the second step with subsystem 119 of the protective control, the reason for the commencement of surge will be presumably investigated and eliminated. After that, both the subsystems 118 and 119 must be successively prepared for operation again.

After the subsystem 118 is prepared for operation, the valve 134 is opened. The valve 129 at that time has been already switched as a result of the previous operation of the subsystem 119, and thus has connection the input of the transmitter 141, normally connected to the point A, to the atmosphere.

Two stages are necessary to prepare the subsystem 119 for operation. The first stage includes the following three actions: (1) The valve 133 must be opened manually or remotely, thus connecting the volume 131 to the atmosphere and equalizing the pressure in both inputs of the transmitter 141. (2) As a result, the relay 128 operates and gives the signal for simultaneous closing of the valve 107 and switching of the valve 129 to connect one input of the transmitter 141 to the point A, the other input still being connected to the point B. (3) The valve 133 should then be closed manually or remotely. This means that no pressure differential can appear across the transmitter 141, and, accordingly, the valve 107 cannot be opened until the valve 134 is closed as a result of an operating of the subsystem 118 caused by surge, as was explained above. Consequently, the second and final stage of preparation of the subsystem 119 for operation includes only one action, closing said valve 134. This action, as follows from the previous explanations, is accomplished automatically, when the subsystem 118 operates.

It deserves mentioning that the program of opening and closing the valves 125 and 133 which is necessary to prepare the subsystems 118 and 119 for operation can be realized not only manually or remotely, but also automatically, by means of a special separate subsystem which is not a subject of the present invention.

It is also important to mention that it is not always expedient to use both of the above described two steps of protection. Whether one or two steps is used depends mainly on the compressor performance and the operating conditions. Two steps would be recommended, for example, when the output of a compressor is considerable. Then the first step of the protective system would normally be used when the increase of the resistance in the discharge of a compressor is relatively small (though it could be very quick). Then the opening of the smaller relief means will not considerably influence the maintaining of the main controlled parameter, even during the transient response, because the means described previously provides for the invariability. However, if the increase of the resistance is big enough and the opening of the smaller relief means cannot prevent a compressor from repeated surge, then the second step of the protective system automatically opens the bigger relief means which has capacity to protect compressor from surge in any event.

When a compressor's output is not too big, one step instead of two would be recommended. In such cases a fast acting relief means must have enough capacity to blow off or recirculate the whole output of a compressor.

Another version can also be used. For example, a system which may employ a single quick acting relief means having two successive steps of opening. The first step would consist of presetting a partial opening, and the second step would constitute the opening of the relief means completely. This version could be preferable, particularly in some cases when it is necessary to maintain the constant pressure, for example, in the discharge of the compressor.

The operation of the system shown in FIG. 1 can be illustrated by example shown in FIG. 2. Assume that at an initial moment the resistance of the discharge network 104 is represented by the curve FF, the dynamic compressor works at the point A, and both of the valves 106 and 107 (see FIG. 1) are closed. Then, as a result of increasing the resistance of the delivery network 104, the resistance characteristic of the network changes its position and takes the position HH. Under such circumstances the control system 144, acting through the summarizing device 116 and speed controller 145, begins to increase the speed of rotation, the operating line AB of the compressor finally crosses the surge line at the point B, and the surge begins. When surge begins, the pressure in the pipeline 104 drops at a fast rate. As a result, the pressure differential appears across the transmitter 140 of the subsystem 118, and this subsystem operates, opening the valve 106 as was described above.

As a result of opening the valve 106, the resistance of the delivery network 104 decreases, and the corresponding characteristics of the resistance of the delivery network, takes the position GG (FIG. 2). Simultaneously the scaler 127 (subsystem) 118) and the control system 144, acting at the steam distributing device 103 through the summarizing device 116, speed controller 145 and the actuator 117 increases the output of the compressor 101 to compensate for the flow rate through the blow-off valve 106.

Both the subsystem 118 and the system 144 provide for the near invariability of the mass flow rate to the user 105. This means that even during the transient response, the user 105 will receive the required amount of the air ($W_1$) (FIG. 2) with only a very small deviation. When the resistance of the delivery network is represented by the curve HH (FIG. 2), and the required flow rate to the user 105 is $W_1$, then the necessary pressure $P_1$ must correspond to the point C'. If the geometry of the network 104 stays unchanged from the moment of the beginning of surge then, after opening the valve 106, the pressure level $P_1$ must stay unchanged, and correspondingly the operating point of the compressor 101 will move from the point B to the point C. The section CC' will correspond then to the amount of air blown off into the atmosphere through the valve 106.

Under the further growth of the resistance in the delivery network 104, the new flow control line CD finally will cross the speed control line EL at the point D.

The line EL is an approximation of the speed control line for the purpose of simplifying this explanation. Actually, when using proportional speed controllers, as is customary, the picture is more complicated. In particular, there will be as many speed control lines as number of the points of intersection of the possible flow control lines with the line EL. However, for the understanding of the principle of operation of the described protective control system, it is not a significant difference.

The capacity of the upsteam blow-off valve 106 is selected so that no matter where the initial flow control line AB crosses the surge line OM, the point D will always be located on the right hand side from said surge line. This will provide for a wide range of changing of resistance in the delivery network, which can happen as a result of disturbances which are not so large as to cause an interruption of the user's process. If after reaching the point D, the resistance of the delivery network 104 continues to increase, and the characteristic of the network 104 adopts the curve HH again, the operating line of the compressor 101 crosses the surge line OM a second time, at the point E. As a result, the second step of the protective control (the subsystem 119) opens the downstream blow-off valve 107, and thus decreases the resistance of the delivery network 104, which characteristic now adopts the position KK.

The capacity of the valve 107 is selected so that the point R of the intersection of the line KK with the speed control line EL would always be located at the safe distance from the surge line OM.

Obviously, many modifications and variations of the present invention are possible in light of the above teachings. It is therefore to be understood that, within the scope of the appended claims, the invention may be practiced otherwise than as specifically described.

We claim:

1. A method of integrated antisurge control of a controlled object including a dynamic compressor having a discharge and a suction port, a driver for said compressor, a pipeline connecting the discharge port of the compressor to a user of compressed gas, a quick-acting on-off fluid relief means connected to said pipeline, and a control means for controlling a main controlled parameter, said parameter being one of (a) the mass flow rate of a gas to the user, (b) the discharge pressure of the compressor, (c) the suction pressure of the compressor and (d) the speed of rotation of the compressor, said method comprising:

measuring one of the speed of pressure drop in the discharge port of the compressor and the speed of flow drop in the suction port of the compressor;

simultaneously operating two different means, one of said two means being said fluid relief means, the other of said two means being a means operatively connected to the compressor for changing the flow rate of a gas through the compressor, said operation further comprising two simtultaneous actions, one of the actions being the full automatic opening of the fluid relief means when the rate of one of the pressure drop in the discharge port of the compressor and the flow drop in the suction port of the compressor reaches a magnitude corresponding to the beginning of surge, the time of said full opening of the fluid relief means being chosen so as to prevent the developing of surge as indicated by said one of the speed of pressure drop in the discharge port of the compressor and the speed of flow drop in the suction port of the compressor, and the other of said actions being acting on the means for changing the flow rate through the compressor to compensate for the decrease of the flow rate to the user caused by the outflow of the compressed gas through the opened relief means so as to insure the invariability of one of said main controlled parameters.

2. A method of integrated antisurge control of a controlled object including a dynamic compressor having a discharge and a suction port, a driver for said compressor, a pipeline connecting the discharge port of the compressor to a user of compressed gas, two quick-acting on-off fluid relief means connected to said pipeline, the transmissive capacity of the first one of said relief means being equal to a certain pre-established part of the full actual output of the compressor, the transmissive capacity of the second one of said relief means being equal to the full actual output of the compressor, and a control means for controlling a main controlled parameter, said parameter being one of (a) the mass flow rate of a gas to the user, (b) the discharge pressure of the compressor, (c) the suction pressure of the compressor, and (d) the speed of rotation of the compressor, said method comprising:

measuring one of the speed of pressure drop in the discharge port of the compressor and the speed of flow drop in the suction port of the compressor;

a first step being simultaneously operating two different means, one of said two means being said first fluid relief means, the other of said two means being a means operatively connected to the compressor for changing the flow rate of a gas through the compressor, said operation further comprising two simultaneous actions, one of the actions being the full automatic opening of the first fluid relief means when the rate of one of the pressure drop in the discharge port of the compressor and the flow drop in the suction port of the compressor reaches a magnitude corresponding to the beginning of surge, the time of said full opening of the first fluid relief means being chosen so as to prevent the developing of surge as indicated by said one of the speed of pressure drop in the discharge port of the compressor and the speed of flow drop in the suction port of the compressor, and the other of said integrated actions being acting on the means for changing the flow rate through the compressor to compensate for the decrease of the flow rate to the user caused by the outflow of the compressed gas through the opened first relief means so as to insure the invariability of one of said main controlled parameters;

a second step being a full automatic opening of said second fluid relief means after the first fluid relief means has been already opened and if the rate of one of the pressure drop in the discharge port of the compressor and the flow drop in the suction port of the compressor reaches a magnitude corresponding to the beginning of surge again.

3. A control means for integrated antisurge control of a controlled object including a dynamic compressor having a discharge and a suction port, a driver for said compressor, a pipeline connecting the discharge port of the compressor to a user of compressed gas, a quick-acting on-off fluid relief means connected to said pipeline, and a control means for controlling a main controlled parameter, said parameter being one of (a) the mass flow rate of a gas to the user, (b) the discharge pressure of the compressor, (c) the suction pressure of the compressor, and (d) the speed of rotation of the compressor, said control means including a means for changing the flow rate of a gas through the compressor, said improvement comprising:

a three-way valve having an actuator;

a pressure differential means having two inputs, the first input being connected to the three-way valve and the second input being connected to one of an intermediate volume and a port having a pressure substantially lower than the pressure in the discharge port of the compressor, said pressure differential means transmitting negative, zero or positive output signals, the negative signal appearing when the pressure in the first input of the pressure differential means is higher than the pressure in the second input of the pressure differential means, the zero signal appearing when the pressures in both inputs of the pressure differential means are equal, and the positive signal appearing when the pressure in the first input of the pressure differential means is lower than the pressure in the second input of the said pressure differential means;

a monitor switch means for receiving the input signals from the pressure differential means;

said three-way valve connecting said first input of the pressure differential means to one of the discharge port of the compressor and the port having a pressure substantially lower than the discharge pressure;

an intermediate volume, having two ports, an entrance port connected to the discharge port of the compressor through a setting throttling means having an adjustable position for allowing a choice of the required difference of the rate of pressure change between the two different inputs of the pressure differential means during periods of surge, an exit port from said intermediate volume being connected to one of the pressure differential means and, through an on-off cocking throttling means, to said port having a pressure substantially lower than the discharge pressure;

said cocking throttling means being used for cocking the control apparatus to prepare it for subsequent operation after it has been operated previously by temporarily connecting the intermediate volume and the second input of the pressure differential means to the port having a pressure substantially lower than the discharge pressure;

said monitor switch means being connected to the actuator of the three-way valve, to the actuator of the first fluid relief means, and to the means for changing the flow rate of a gas through the compressor, said monitor switch means having only two different output signals, the level of one of said output signals being higher than the other one, said higher output signal of the monitor switch means appearing when the input signal coming from the pressure differential means becomes positive and reaches a preset value, this higher output signal being used for the simultaneous;

full opening of the on-off fluid relief means;

switching the three-way valve by acting on its actuator to connect the pressure differential means through said three-way valve to the port having a pressure substantially lower than the discharge pressure, and thus fixing the fluid relief means in the wholly opened position;

actuating the means for changing the flow rate through the compressor;

said simultaneous opening of the on-off fluid relief means and the actuating of the means for changing the flow rate through the compressor being integrated actions provided to compensate for the outflow of a compressed gas through the opened fluid relief by means by a corresponding increase of the flow rate of a gas through the compressor and thus to insure the invariability of one of said possible main controlled parameters;

said monitor switch means giving its lower output signal when its input signal, coming from the pressure differential means, becomes one of zero and negative, this lower output signal being used for the simultaneous:

closing of the on-off fluid relief means;

switching the three-way valve by acting on its actuator to connect the pressure differential means through the three-way valve to the discharge port of the compressor, and thus fixing the fluid relief means in the wholly closed position;

actuating the means for changing the flow rate through the compressor;

said simultaneous closing of the on-off fluid relief means and the actuating of the means for changing the flow rate through the compressor being the integrated actions provided to compensate for the interrupting of the outflow of a compressed gas through the fluid relief means caused by its closing, by the corresponding decrease of the flow rate of a gas through the compressor, and thus to insure the invariability of one of the said main controlled parameters.

4. A control means for integrated antisurge control of a controlled object including a dynamic compressor having a discharge and a suction port, a driver for said compressor, a pipeline connecting the discharge port of the compressor to the user of a compressed gas, two quick-acting on-off fluid relief means connected to said pipeline, the transmissive capacity of the first one of them being equal to a certain pre-established part of the full actual output of the compressor, the transmissive capcity of the second one of the fluid relief means being equal to at least the full actual output of the compressor, and a control means for controlling a main controlled parameter, said parameter being one of (a) the mass flow rate of a gas to the user, (b) the discharge pressure of the compressor, (c) the suction pressure of the compressor, and (d) the speed of rotation of the compressor, said control means including a means for changing the flow rate of a gas through the compressor, said improvement comprising:

a first and a second subsystem operating successively;

the first subsystem including a first three-way valve having an actuator;

a first pressure differential means, having two inputs, the first input being connected to the first three-way valve and the second input being connected to one of a first intermediate volume and a port having a pressure substantially lower than the pressure in the discharge port of the compressor;

said first pressure differential means transmitting negative, zero or positive output signals, the negative signal appearing when the pressure in the first input of the first pressure differential means is higher than the pressure in the second input of the first pressure differential means, the zero signal appearing when the pressures in both inputs of the first pressure differential means are equal, and the positive signal appearing when the pressure in the first input of the first pressure differential means is lower than the pressure in the second input of the first pressure differential means;

a first monitor switch means receiving its input signals from the first pressure differential means;

said first three-way valve connecting said first input of the first pressure differential means to one of the discharge port of the compressor and the port having a pressure substantially lower than the discharge pressure; the first intermediate volume, having two ports, an entrance port connected to the discharge port of the compressor through a first setting throttling means, said first setting throttling means having adjustable position for allowing a choice of the required difference of the rate of pressure change in the two different inputs of the first pressure differential means during periods of surge, an exit port of said first intermediate volume being connected to one of the first pressure differential means and, through a first on-off cocking throttling means, to said port having a pressure substantially lower than the discharge pressure;

said first cocking throttling means being used for cocking the first subsystem to prepare it for subsequent operation after it has been operated previously, by temporarily connecting the first intermediate volume and the second input of the first pressure differential means to the port having a pressure substantially lower than the discharge pressure;

said first monitor switch means being connected to the actuator of the first three-way valve, to the actuator of the first fluid relief means, to the second subsystem to prepare it for operation, and to the means for changing the flow rate of a gas through the compressor, said first monitor switch having only two different output signals, the level of one of the signals being higher than the level of the other, said higher output signal of the first monitor switch means appearing when the input signal coming from the first pressure differential means becomes positive and reaches a preset value, this higher output signal being used for the simultaneous;

full opening of the first on-off fluid relief means;

switching the first three-way valve by acting on its actuator to connect the first pressure differential means through said first three-way valve to the port having a pressure substantially lower than the discharge pressure, and thus fixing the first fluid relief means in the wholly opened position;

preparing the second subsystem for possible operation;

actuating the means for changing the flow rate through the compressor;

said simultaneous opening of the first on-off fluid relief means and the actuating of the means for changing the flow rate through the compressor being integrated actions provided to compensate for the outflow of a compressed gas through the opened first fluid relief means by a corresponding increase of the flow rate of a gas through the compressor and thus to insure the invariability of one of said possible main controlled parameters;

said first monitor switch means giving its lower output signal when its input signal, coming from the first pressure differential means becomes zero or negative, this lower output signal being used for the simultaneous:

closing of the first on-off fluid relief means;

switching the first three-way valve by acting on its actuator to connect the first pressure differential means through the first three-way valve to the discharge port of the compressor and thus fixing the first fluid relief means in the wholly closed position;

deactivating the second subsystem, and actuating the means for changing the flow rate through the compressor;

said simultaneous closing of the first on-off fluid relief means and the actuating of the means for changing the flow rate through the compressor being integrated actions provided to compensate for the interrupting of the outflow of a compressed gas through the first fluid relief means caused by its closing, by the corresponding decrease of the flow rate of a gas through the compressor, and thus to insure the invariability of one of the said main controlled parameters;

the second subsystem including a second three-way valve having an actuator; a second pressure differential means having two inputs, the first input being connected to the second three-way valve and the second input being connected to one of a second intermediate volume, the discharge port of the compressor, and the port having a pressure substantially lower than the pressure in the discharge port of the compressor;

said second pressure differential means transmitting a negative, zero or positive output signals, the negative signal appearing when the pressure in the first input of the second pressure differential means is higher than the pressure in the second input of the second pressure differential means, the zero signal appearing when the pressures in both of the inputs of the second pressure differential means are equal, and the positive signal appearing when the pressure in the first input of the second pressure differential means is lower than the pressure in the second input of said second pressure differential means;

a second monitor switch means receiving its input signals from the second pressure differential means;

said second three-way valve connecting the first input of the second pressure differential means to one of the discharge port of the compressor and the port having pressure substantially lower than the discharge pressure;

the second intermediate volume having two ports, an entrance port connected to the discharge port of the compressor through a second setting throttling means having adjustable position for allowing a choice of the required difference of rate of pressure change on the two different inputs of the second pressure differential means during periods of surge; and an exit port of said second intermediate volume being connected to one of:

the second pressure differential means;

the port having a pressure substantially lower than the discharge pressure through a second on-off cocking throttling means; and the discharge port of the compressor, through a third throttling means, having an actuator and being used to both prepare the second subsystem for operation and to deactivate the second subsystem;

the actuator of the third throttling means receiving its input signals from the first monitor switch means, the higher signal of said first monitor switch means being used for the opening and the lower signal being used for the closing of said third throttling means;

the opening of said third throttling means being necessary for deactivating the second subsystem, and the closing of the third throttling means being necessary for preparing the second subsystem for operation;

said second on-off cocking throttling means being used for cocking the second subsystem to prepare it for the subsequent operation after it has been operated previously by temporarily connecting the second intermediate volume and the second input of the second pressure differential means to the port having a pressure substantially lower than the discharge pressure;

said second monitor switch means being connected to the actuator of the second pressure differential means, and to the actuator of the second fluid relief means;

said second monitor switch means having only two different output signals, the level of one of them being higher than the level of the other, said higher output signal of the second monitor switch appearing when its input signal coming from the second pressure differential means becomes positive and reaches a preset value, this last said higher output signal being used for the simultaneous opening of the second on-off fluid relief means and switching the second three-way valve by acting on its actuator to connect the second pressure differential means through said second three-way valve to the port having a pressure substantially lower than the discharge pressure, and thus fixing the second fluid relief means in the wholly opened position;

said second monitor switch means giving its lower output signal when its input signal coming from the second pressure differential means becomes zero or negative; and this last said lower output signal being used for the simultaneous closing of the second fluid relief means, and switching of the second three-way valve by acting on its actuator to connect the second pressure differential means through the second three-way valve to the discharge port of the compressor, and thus fixing the second fluid relief means in the wholly closed position.

* * * * *